United States Patent

[11] 3,586,053

[72] Inventor Ernest C. Browning
2383 Zollinger Road, Columbus, Ohio 43221
[21] Appl. No. 868,699
[22] Filed Oct. 23, 1969
[45] Patented June 22, 1971

[54] MIXING VALVE
10 Claims, 8 Drawing Figs.
[52] U.S. Cl. ................................................. 137/636.4
[51] Int. Cl. .................................................. F16k 11/14
[50] Field of Search ..................................... 137/636.4, 636.1, 636, 636.3, 636.2

[56] References Cited
UNITED STATES PATENTS
| | | | |
|---|---|---|---|
| 2,519,448 | 8/1950 | Fairchild | 137/636.1 |
| 2,934,091 | 4/1960 | Chapou | 137/636.1 X |
| 2,966,928 | 1/1961 | Fairchild | 137/636.1 X |
| 3,468,344 | 9/1969 | Sanford | 137/636.4 |

FOREIGN PATENTS
| | | | |
|---|---|---|---|
| 635,030 | 1/1962 | Canada | 137/636 |
| 363,011 | 9/1938 | Italy | 137/636.1 |

Primary Examiner—M. Cary Nelson
Assistant Examiner—R. B. Rothman
Attorney—Melville, Strasser, Foster and Hoffman ABSTRACT: A mixing valve comprising a valve body having the configuration of a truncated cone, at least two independent fluid inlets and an independent fluid outlet for each inlet. A first valve seat is located between one of the inlets and its outlet and a second valve seat is located between the other of the inlets and its outlet. Two plungerlike valve elements are reciprocally mounted in the valve body, each element having one end adapted to cooperate with one of the valve seats and a free end extending beyond the conical surface of the valve body. An actuator cap is mounted on the valve body and has an inner surface in the configuration of a truncated cone, adapted to contact the free ends of the valve elements. The actuator cap is movable vertically to regulate the flow of fluid from full on to full off. The conical inner surface of the actuator cap has at least one flat whereby rotation of the cap will regulate the fluid flow over the range between all from one outlet to all from the other outlet.

PATENTED JUN22 1971
3,586,053
SHEET 1 OF 2
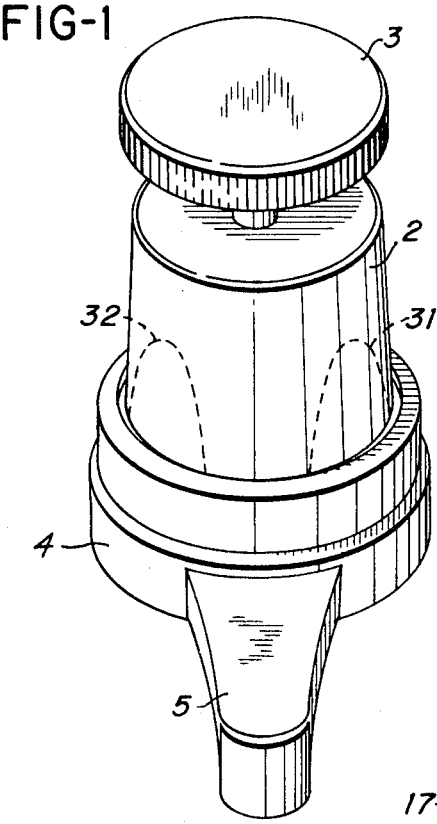
FIG-1
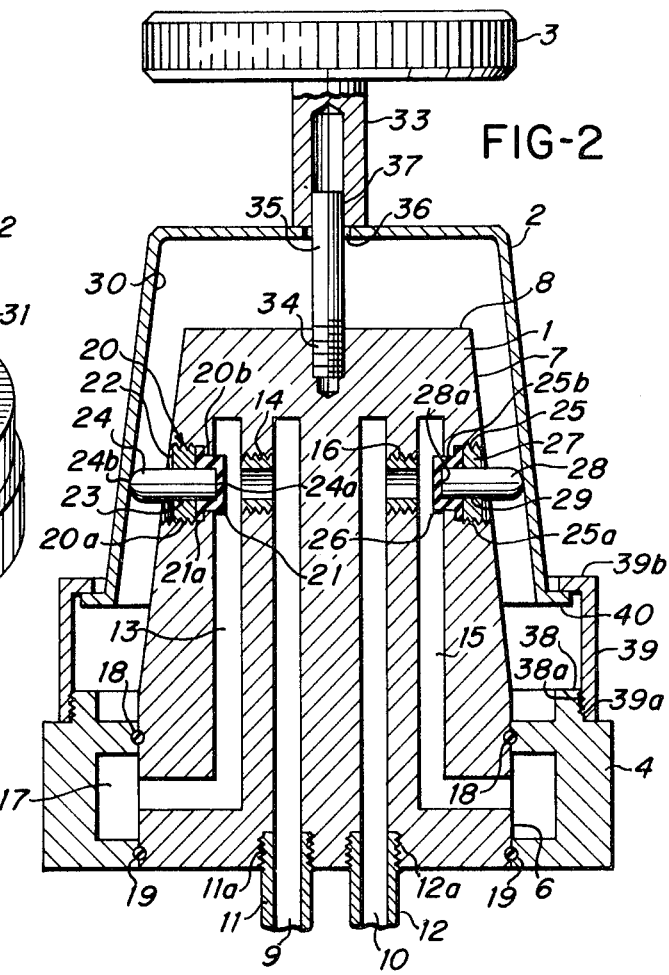
FIG-2
FIG-3
FIG-4
INVENTOR
ERNEST C. BROWNING
BY *Melville, Strasser, Foster and Hoffman*
ATTORNEYS PATENTED JUN22 1971 3,586,053
SHEET 2 OF 2
FIG-7
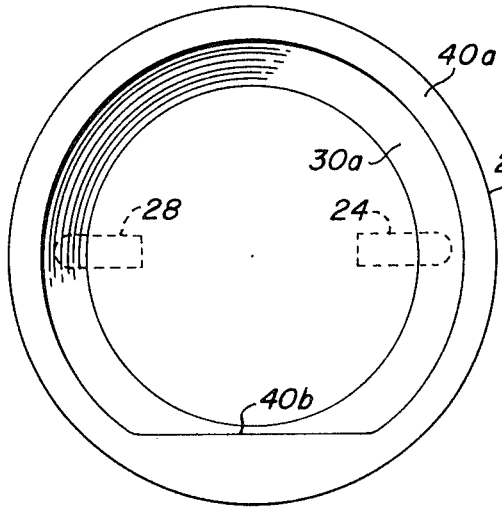
FIG-5
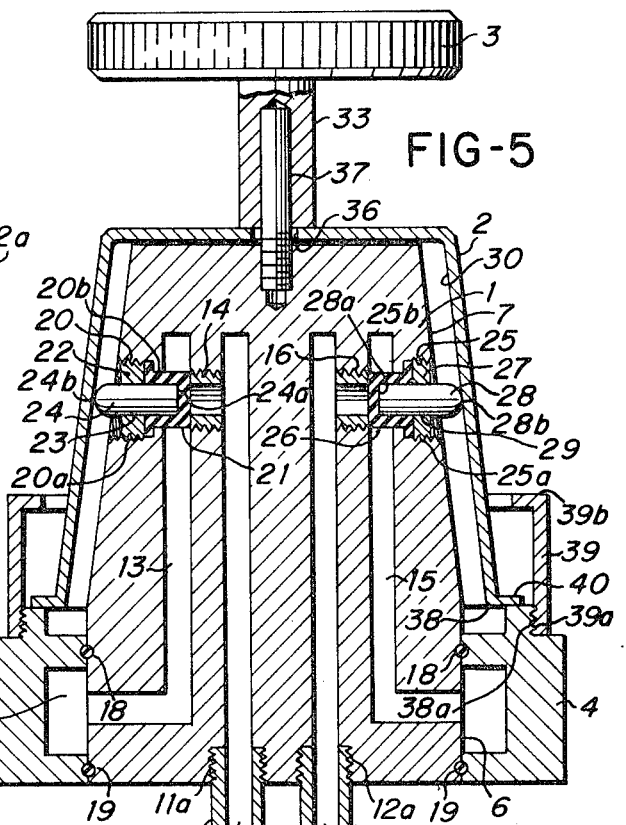
FIG-6
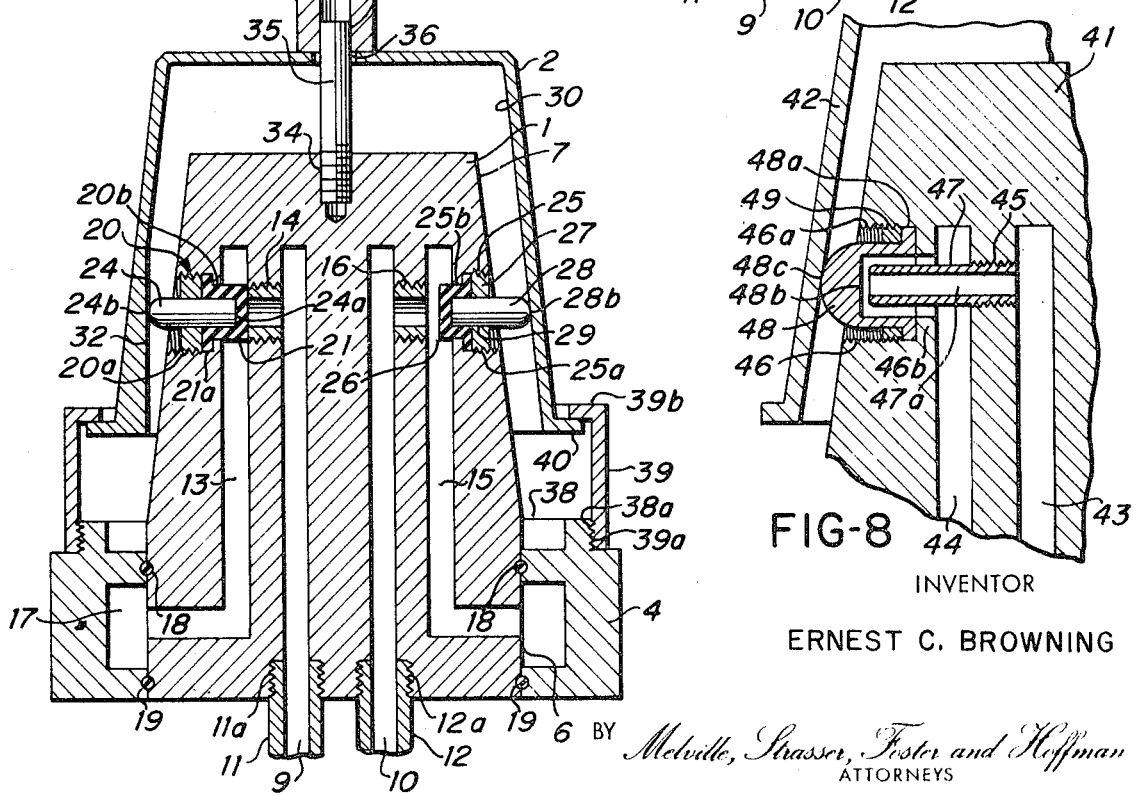
FIG-8
INVENTOR
ERNEST C. BROWNING
BY *Melville, Strasser, Foster and Hoffman*
ATTORNEYS

MIXING VALVE

BACKGROUND OF THE INVENTION

1. Field of the Invention

The invention relates to a mixing valve and more particularly to a mixing valve of the type having a single manually operated handle.

2. Description of the Prior Art

While not intended to be so limited, the valve of the present invention will be described in its application as a single handle faucet.

In recent years, faucets and the like of the single handle type have increased in popularity and have come into widespread use by virtue of their convenience and advantages. Heretofore, however, single handle faucets have been characterized by complex construction utilizing numerous specially formed parts. This has rendered such faucets expensive to purchase and difficult and expensive to repair.

In addition, by virtue of wear, mineral deposits and the like, single handle faucets have often been subject to lack of positive shutoff and internal leakage.

The single handle faucet of the present invention is extremely simple in construction and positive in its action. The resilient expendable parts are not subject to friction. The construction greatly reduces the possibility of leakage other than through the spout.

For purposes of an exemplary showing, the faucet of the present invention will be described with respect to a kitchen sink installation. It will be understood by one skilled in the art, however, that the structure of the present invention may be used wherever a single handle faucet would be desirable. For example, it may be used in association with a shower, bathtub, lavatory or the like.

SUMMARY OF THE INVENTION

The single handle valve of the present invention comprises a valve body, at least a portion of the exterior of which has the configuration of a truncated cone. The valve body contains independent hot and cold water inlets and independent hot and cold water outlets. The outlets are adapted to lead to a mixing chamber. A valve seat is located between the inlet and outlet for hot water, and another valve seat is located between the inlet and outlet for cold water. A pair of plungerlike valve elements are slidably mounted in the valve body. Each valve element has resilient means at one end capable of seating against one of the above mentioned seats and a free end extending beyond the conical surface of the valve body. The valve elements are capable of independent movement between seated and unseated positions.

An actuator cap is mounted on and extends over the valve body. The actuator cap has an interior surface having the configuration of a hollow truncated cone. The interior surface is adapted to contact the free ends of the valve elements. The actuator cap is movable vertically whereby to regulate the flow of water between full off and full on, by virtue of the interaction of the interior conical surface of the actuator cap and the free ends of the valve elements.

In addition, the interior conical surface of the actuator cap has at least one flat. By turning the actuator cap to positions where the flat contacts one or the other of the free ends of the valve elements, the water temperature may be regulated over the range between all hot and all cold.

Suitable handle means is affixed to the actuator cap to enable its vertical movement and its rotation. Similarly, an appropriate mixing chamber and spout means are provided in association with the valve body. Finally, a stop means is provided to limit the upward vertical movement of the actuator cap.

BRIEF DESCRIPTION OF THE DRAWINGS

FIG. 1 is a perspective view of the valve of the present invention.

FIG. 2 is a cross-sectional view of the valve of the present invention illustrating the relative positions of the parts when the hot and cold water are full on.

FIG. 3 is a bottom plan view of the actuator cap.

FIG. 4 is a cross-sectional view of the actuator cap taken along the section lines 4—4 of FIG. 3.

FIG. 5 is a cross-sectional view similar to FIG. 2 and illustrating the relative positions of the parts when the hot and cold water are in the full off position.

FIG. 6 is a view similar to FIGS. 2 and 5 illustrating the relative positions of the parts when the hot water is full off and the cold water is full on.

FIG. 7 is a plan view of another embodiment of the actuator cap.

FIG. 8 is a fragmentary, cross-sectional view illustrating an alternate form of a valve assembly for the valve of the present invention.

DESCRIPTION OF THE PREFERRED EMBODIMENTS

An exemplary embodiment of the structure of the present invention is illustrated in FIG. 1. In this embodiment, a valve body 1 (see FIG. 2) is surmounted by an actuator cap 2 having a handle means 3 affixed thereto. The valve body is surrounded by an annular element 4 comprising a mixing chamber and carrying a spout 5. The element 4 and spout 5 are pivotally mounted to the valve body so that the spout may be moved through a range of radial positions.

The assembly is clearly illustrated in FIG. 2, where like parts have been given like index numerals. The valve body 1 has a lower cylindrical portion presenting a cylindrical surface 6. The upper portion of the valve body has the configuration of a truncated cone providing a conical surface 7 and a flat, horizontal top 8.

The valve body contains a pair of passages 9 and 10. While the reverse may be true, for purposes of an exemplary illustration, the passage 9 will be considered the hot water inlet and the passage 10 will be considered the cold water inlet. The inlets 9 and 10 may be connected to sources of hot and cold water by any suitable means, as for example by conduits 11 and 12, threadedly engaged in the valve body as at 11a and 12a.

The hot water inlet 9 is connected to a hot water outlet 13 through a valve seat means 14. Similarly, the cold water inlet 10 is connected to a cold water outlet 15 through a valve seat means 16. The valve seats 14 and 16 may comprise integral portions of the valve body, or they may be removable and replaceable elements threadedly engaged in place, as illustrated in FIG. 2. The hot and cold water outlets 13 and 15 lead to an annular mixing chamber 17 formed by the element 4 and the cylindrical valve body surface 6. As indicated above, the element 4 is pivotal about the valve body and a watertight seal between the two may be achieved in any suitable manner as, for example, by O-rings 18 and 19. Water from the mixing chamber 17 will be discharged to the sink basin via spout 5 (see FIG. 1).

The valve body 1 is provided with a transverse hole generally indicated at 20. The hole 20 has a first threaded portion 20a and a second portion 20b of reduced diameter. The portion 20b extends through the hot water outlet 13 to the hot water inlet 9. That portion of the hole lying between the hot water inlet and outlet is threaded and is adapted to receive the seat 14.

A resilient, hat-shaped diaphragm 21 is located in the hole 20. The hat-shaped diaphragm has an annular rim 21a. The diaphragm 21 is located in the hole 20 so that its rim 21a abuts the shoulder formed between the hole portion 20I and the hole portion 20b of reduced diameter. The diaphragm is held in place by a disc 22 threadedly engaged in the portion 20a of the hole 20.

The disc 22 has a perforation 23 through which a plunger 24 extends. The end 24a of the plunger abuts the inside surface of the hat-shaped diaphragm 21. The end 24b of the plunger extends beyond the conical surface 7 of the valve body 1 and may be rounded as shown. The plunger 24 is adapted to have a sliding fit in the perforation 23 of the disc 22. That portion of the plunger 24 which slides within the perforation 23 may have any suitable cross section, the perforation 23 having a matching configuration.

From the above description it will be evident that when the plunger 24 and hat-shaped diaphragm 21 are in the position shown, hot water will be free to flow from the inlet 9 to the outlet 13. If the plunger 24 is caused to move to the right in FIG. 2, the hat-shaped diaphragm 21 will be forced against the seat means 14 and the flow of water from the inlet 9 to the outlet 13 will cease. The amount of water passing from the inlet 9 to the outlet 13 will depend upon the spacing between the diaphragm 21 and the seat 14.

A similar valve element is provided to control the flow of cold water from the inlet 10 the outlet 15.

The valve body 1 has a second transverse hole 25, similar to the hole 20 and extending from the conical valve body surface 7, through the outlet 15 to the inlet 10. The hole 25 has a large diameter portion 25a and a small diameter portion 25b. A hat-shaped diaphragm 26 is held in place by a disc 27 in the same manner described above. A plunger 28 is slidably mounted in a perforation 29 in the disc 27 and will cause the hat-shaped diaphragm 26 to move toward or away from the seat 16 in the same manner described above. Thus, the flow of hot and cold water can be regulated throughout the range of full on to full off by the proper positioning of the plungers 24 and 28, respectively. It will be noted that the plungers 24 and 28 are independent of each other. In addition, by virtue of their resilient nature, the hat-shaped diaphragms 21 and 26 will tend to urge their respective plungers 24 and 28 to the positions shown in FIG. 2.

The actuator cap 2 is adapted to overlie and surround the valve body 1 and its conical surface 7. The actuator cap may have any suitable exterior configuration. It does have, however, an interior configuration of a hollow truncated cone presenting a conical interior surface 30. The surface 30 is adapted to contact the ends 24b and 28b of the plungers 24 and 28.

The conical interior surface 30 is provided with two flats 31 and 32, configured and located as shown in FIGS. 3 and 4. The flats 31 and 32 present vertical surfaces and are of an arcuate or parabolic shape. The continuous edge 31a of the flat 31 is rounded so as to blend smoothly into the conical surface 30. The same is true of the edge 32a of the flat 32. The purpose of the flats 31 and 32 will be described hereinafter.

The actuator cap 2 is provided with handle means 3. The handle means may be of any desired configuration. For purposes of an exemplary illustration, the actuator cap 2 is shown as having a disclike handle 3. The mode of attachment of the handle to the actuator cap does not constitute a limitation on the present invention. The handle may be permanently or removably affixed to the cap. For purposes of illustration, the handle 3 is shown as connected to the actuator cap by a shank 33.

The actuator cap-handle assembly is mounted on the valve body. Again, the mode of mounting does not constitute a limitation on the present invention except that the cap must be so mounted as to be movable vertically and rotatable. Again, for purposes of illustration, the valve body 1 is shown as having a threaded hole 34 in which the threaded end of a vertical shaft 35 is engaged. The actuator cap 2 and the handle shank 33 are provided with coaxial holes 36 and 37 adapted to receive the shaft 35 with a sliding fit. Thus, the handle and actuator cap assembly is supported by the valve body and is capable of both vertical movement and rotation.

From the above description, it will be evident that simple vertical movement of the actuator cap-handle assembly will, through the cooperation of plunger ends 24b and 28b and the conical surface 30 regulate the flow of hot and cold water through the range of full on and full off. Vertical movement of the actuator cap and handle assembly alone, however, will cause the plungers 24 and 28 to move in equal amounts so that both the hot and cold water will be equally regulated. FIG. 2 illustrates the actuator cap-handle assembly in its uppermost position with both the hot and cold water in the full on condition. FIG. 5, wherein like parts have been given like index numerals, illustrates the actuator cap-handle assembly in its lowermost position with both the hot and cold water in the full off condition. It will be understood by one skilled in the art that by varying the vertical position of the actuator cap-handle assembly between the extremes of FIGS. 2 and 5, the amount of hot and cold water flow may be varied between full off and full on, with the hot and cold water flow being equal.

Means may be provided for determining the uppermost position of the actuator cap-handle assembly so as to prevent is complete removal from the valve body. As shown in FIGS. 2 and 5, the annular element 4 may be provided with an upstanding, annular extension 38 having its outside surface threaded as at 38a. An annular rim 39, having its lower inside surface threaded as at 39a, is threadedly engaged on the extension 38. The upper edge of the rim 39 is inturned as at 39b.

The lowermost edge of the actuator cap 2 may be outturned as at 40. Thus, the out-turned edge 40 of the actuator cap and the inturned edge 39b of the rim 39 will cooperate to determine the uppermost position of the actuator cap-handle assembly.

In order to regulate the temperature of the water exiting via spout 5 through the range of from all hot to all cold, means must be provided to actuate the plungers 24 and 28 selectively. These means comprise the flats 31 and 32 on the inside surface of the actuator cap (see FIGS. 3 and 4). From FIG. 3 it will be evident that the flats 31 and 32 lie to one side of the section line 4—4 of the figure. Thus, when the actuator cap and handle assembly is affixed to the valve body, the flats may be located to the front of the faucet assembly or to the rear of the faucet assembly. The desired results may be achieved with either orientation. For purposes of an exemplary showing, the flats will be assumed to be located to the front of the faucet assembly as is shown in dotted lines in FIG. 1.

The regulation of water temperature may be most clearly understood from FIG. 3 wherein plungers 24 and 28 are shown in dotted lines. When both the hot and cold water are full off, the actuator cap 2 will be oriented as shown in FIG. 3 with both plungers 24 and 28 contacted by conical surface 30 (see also FIG. 5). Vertical movement of the actuator cap 2 without change in orientation, will cause both plungers 24 and 28 to move outwardly an equal amount so that both the hot and cold water will be on by an equal amount. If, however, the actuator cap is then rotated in a counterclockwise direction (as seen in FIG. 3) the flat 32 will be caused to approach the free end of the plunger 24. As the flat 32 contacts the plunger 24, the plunger will be caused to move inwardly, retarding the flow of hot water. The plunger 28 will still be contacted by the conical surface 30 and will remain unchanged. When the flat 32 reaches a position wherein the axis of the plunger 24 is substantially normal to it, the hot water will be completely shut off, but the cold water will remain unchanged. This condition is illustrated in FIG. 6 wherein like parts have been given like index numerals.

In a similar manner, if the actuator cap were turned in a clockwise direction (as viewed in FIG. 3) it will be understood that the plunger 28 will be caused to move inwardly when contacted by the flat 31 and the plunger 24 would remain unchanged. Thus, the amount of cold water would be reduced until stopped completely when the flat 31 attains a position wherein the axis of the plunger 28 is substantially normal to it.

From the above description, it will be readily seen that the amount of water discharged from spout 5 can be determined by vertical movement of the actuator cap-handle assembly, while the temperature of the water can be regulated by rotating the same assembly.

It will be evident to one skilled in the art that temperature control could also be obtained through the use of an actuator cap having a single flat. Such a cap is illustrated at 2a in FIG.

7. With the exception of the fact that it is provided with a single flat 41, the cap 2a can be otherwise identical to the cap 2 and like parts have been given like index numerals followed by "a." Again, for purposes of illustration, plungers 24 and 28 are shown in dotted lines in FIG. 7. The operation of the actuator cap of FIG. 7 is identical to that of FIG. 3 except that the flat 31 must serve the function of both flats 31 and 32. This simply means that the actuator cap-handle assembly must be turned by a greater amount (i.e. 180°) to go through the range of all hot to all cold.

FIG. 8 is a fragmentary, cross-sectional view of an alternate form of valve assembly for the valve body of the present invention. The Figure illustrates a valve body 41 and an actuator cap 42 substantially identical to the valve body 1 and actuator cap 2 of FIGS. 1 through 7. An inlet means 43 and an outlet means 44, similar to the previously described inlet means 9 and outlet means 13 are provided within the valve body 41. The inlet means 43 and outlet means 44 are joined by a threaded perforation 45. An additional perforation 46 is made in the valve body and intersects the outlet means 44. The perforation 46 is similar to the perforation 20 in FIG. 2. A large diameter portion of the perforation 46 is threaded as at 46a. That portion of the perforation 46 adjacent the outlet means 44 is of smaller diameter, so as to form a shoulder 46b.

The valve assembly of FIG. 8 differs primarily from that previously described in that a valve seat 47, threadedly engaged in the perforation 45, extends well into the perforation 46. The central opening 47a in the valve seat 47 may have a noncircular cross section, if desired, so that the valve seat may be engaged for insertion and removal by an appropriate wrench. A hat-shaped diaphragm 48, having an annular rim 48a is located in the perforation 46, with the rim 48a adjacent the shoulder 46b. The hat-shaped diaphragm is held in place by a threaded disc 49 engaging the threaded portion 46a of the perforation 46. The resilient, hat-shaped diaphragm has a surface 48b adapted to cooperate with the end of the seat 47 to control the flow of fluid from the inlet means 43 to the outlet means 44. The diaphragm 48 also has a portion 48c (which may be rounded if desired) which extends beyond the peripheral surface of the valve body 41. It is the portion 48c of the diaphragm 48 which will cooperate with the inner surface of the actuator cap 42, in the same manner as do the plungers 24 and 28 in FIG. 2.

It will be evident that the embodiment of FIG. 8 enables the elimination of a plunger means, since the portion 48c of the diaphragm serves the same purpose. In all other respects, the operation of a single handle faucet having valve assemblies of the type shown in FIG. 8 will be identical to the operation of the assemblies of FIGS. 1 through 7.

Modifications may be made in the invention without departing from the spirit of it. For example, the hot and cold outlets 13 and 15 could be directed to a mixing chamber located within the valve body itself or to a mixing chamber wholly separate from the valve body. Such mixing chambers could be connected, by suitable conduit means, to any form of spout, shower head or the like.

In addition, stop means to limit the upper movement of the actuator cap could be provided in association with the shaft 35 or in any other suitable manner.

The exterior of the faucet assembly may be provided with any suitable form of indicia to indicate the relative position of the actuator cap with respect to the valve body so that the operator would know what water temperature to expect if he simply turned the faucet on. Further indicia could indicate directions in which to turn the handle in order to get hotter or colder water. Mechanical means may be employed, in association with the actuator cap, to cause it to assume the orientation of FIG. 3 whenever the faucet is turned full off. Thus, when full off the actuator cap would be in a neutral position, so that if the cap were simply pulled upwardly water discharged from the spout 5 would not be all cold or all hot. For example, the bottom portion of the hole 37 in the handle shank 33, and/or the hole 36 in the actuator cap 2 may be provided with a noncircular configuration. Similarly, that portion of the shaft 35 adjacent the valve body may be provided with a corresponding noncircular configuration. Thus, the actuator cap could not be moved to its lowermost "off" position unless these noncircular portions of the shaft 35, and holes 36 and 37 were properly aligned and such alignment can be arranged to cause the actuator cap to be in its neutral position.

Finally, it will be understood that the structure of the present invention could be used for the dispensing and mixing of two or more different fluids, such as chemicals, syrups or the like. The valve body could be provided with more than two sets of inlets, outlets and valve assemblies. Similarly, the actuator cap 2 may be provided with as many internal flats as are needed to accomplish the desired purpose.

The embodiments of the invention in which an exclusive property or privilege is claimed are defined as follows:

1. A valve means comprising a valve body having the configuration of a truncated cone, at least two fluid inlet passages within said valve body, a separate fluid outlet passage within said body for each inlet passage and being adjacent thereto, each outlet passage being joined to its adjacent inlet passage by a first opening in said valve body containing a valve seat, each outlet passage having a second opening coaxial with said first opening and extending from said outlet passage to said conical surface of said valve body, each of said second openings containing a valve element, each of said valve elements having a first end adapted to cooperate with its adjacent valve seat and a second end extending beyond said conical surface of said valve body, each of said valve elements being movable toward and away from its adjacent valve seat to regulate the flow of fluid therethrough, means for urging said valve elements away from their respective valve seats, an actuator cap surrounding said valve body, said actuator cap having an inner surface contacting said second ends of said valve elements, said inner surface being conical and having at least one flat therein, said actuator cap being movable axially whereby said first ends of said valve elements are caused to move equally and simultaneously toward and away from their respective valve seats by virtue of the coaction of said second ends of said valve elements and said conical inner surface of said actuator cap, said actuator cap being rotatable about its axis whereby said at least one flat may be brought into contact with said second end of one of said elements to move said first end of said last mentioned valve element toward and away from its respective valve seat while the other of said valve elements remains unchanged.

2. The structure claimed in claim 1 wherein each of said valve elements for an adjacent pair of inlet and outlet passages comprises a resilient hat-shaped diaphragm having a cylindrical body open at one end with an annular rim thereabout and closed at the other end by a web portion having an exterior surface and an inner surface within said cylindrical body, said exterior surface of said web portion adapted to cooperate with said valve seat in said opening between said inlet and outlet passages, said second opening from said outlet passage through said conical surface of said valve body having a large diameter portion adjacent said conical surface and a small diameter portion adjacent said outlet passage and an annular shoulder therebetween, a perforated disc threadedly engaged in said large diameter portion of said second opening and holding said diaphragm within said second opening with said annular rim abutting said annular shoulder in fluidtight fashion and with said exterior surface of said web portion facing and spaced from said valve seat, a plunger being slidably mounted in said perforation in said disc, one end of said plunger extending within said cylindrical body of said diaphragm and abutting the inside surface of the web portion thereof, the other end of said plunger extending beyond said conical surface of said valve body and contacting said inner surface of said actuator cap whereby movement of said actuator cap will move said plunger axially, moving said web portion toward and away from said valve seat to regulate the fluid flow between said inlet and outlet passages.

3. The structure claimed in claim 1 wherein each of said valve elements for an adjacent pair of inlet and outlet passages comprises a resilient hat-shaped diaphragm having a cylindrical body open at one end with an annular rim thereabout and closed at the other end by a web portion having an inner surface within said cylindrical body and an exterior surface, said second opening from said outlet passage through said conical surface of said valve body having a large diameter portion adjacent said conical surface and a small diameter portion adjacent said outlet passage with an annular shoulder therebetween, a perforated disc threadedly engaged in said large diameter portion of said second opening and holding said diaphragm therein with said annular rim abutting said shoulder in fluidtight fashion, said cylindrical body extending through said perforation in said disc and said exterior surface of said web extending beyond said conical surface of said valve body, said valve seat in said opening joining said inlet and outlet passages extending through said outlet passage, said second opening and into said cylindrical body of said diaphragm, the end of said valve seat being spaced from the inner surface of said diaphragm web portion, said exterior surface of said diaphragm web portion contacting said inner surface of said actuator cap whereby movement of said actuator cap will move said web portion toward and away from said valve seat to regulate the fluid flow therethrough between said inlet and outlet passages.

4. The structure claimed in claim 1 wherein said outlet passages are connected to a mixing chamber.

5. The structure claimed in claim 4 wherein said mixing chamber comprises an annular member rotatably mounted on said valve body in fluidtight fashion.

6. The structure claimed in claim 5 including an elongated spoutlike fluid outlet means communicating with said mixing chamber and mounted on said annular member.

7. The structure claimed in claim 1 wherein said conical inner surface of said actuator cap has two flats therein, said flats being located within 180° of said conical surface.

8. The structure claimed in claim 1 including means for mounting said actuator cap on said valve body.

9. The structure claimed in claim 8 including handle means on said actuator cap.

10. A single handle faucet comprising a valve body having the configuration of a truncated cone, independent hot and cold inlets and independent hot and cold outlets in said body, a first valve seat located between said hot inlet and said hot outlet and a second valve seat located between said cold inlet and said cold outlet, two plungerlike valve elements being reciprocally mounted in said valve body, each element having one end adapted to cooperate with one of said valve seats and a free end extending beyond said conical surface of said valve body, an actuator cap being mounted on said valve body and having an inner surface in the configuration of a truncated cone and adapted to contact said free ends of said valve elements, said actuator cap being movable vertically to regulate the flow of water from full on to full off, said conical inner surface of said actuator cap having at least one flat, said actuator cap being rotatable whereby rotation of said cap will cause said flat to contact said free end of either of said valve elements to regulate the water temperature over the range between all hot and all cold.